United States Patent [19]
Dollesin

[11] Patent Number: 6,105,843
[45] Date of Patent: Aug. 22, 2000

[54] EXTERNAL EQUIPMENT CARRIER WITH CARGO BOX FOR VEHICLE

[76] Inventor: Emil Dollesin, 618 Excelsior Ave., San Francisco, Calif. 94112

[21] Appl. No.: 09/111,239

[22] Filed: Jul. 7, 1998

[51] Int. Cl.[7] ................................................ B60R 9/06
[52] U.S. Cl. .......................... 224/509; 224/495; 224/524; 224/526; 414/462; 414/540
[58] Field of Search ..................................... 224/488, 495, 224/502–510, 531, 532, 522–527, 518–521; 414/462, 540

[56] References Cited

U.S. PATENT DOCUMENTS

| | | | |
|---|---|---|---|
| 3,375,947 | 4/1968 | Kissilov | 414/462 X |
| 3,563,341 | 2/1971 | Bultman | 414/540 X |
| 3,625,405 | 12/1971 | Kezar | 224/435 X |
| 3,837,513 | 9/1974 | Adamek | 414/462 |
| 4,400,129 | 8/1983 | Eisenberg et al. . | |
| 4,695,218 | 9/1987 | Boyer . | |
| 4,738,581 | 4/1988 | Kuhlman | 414/462 |
| 4,844,528 | 7/1989 | Johnson . | |
| 4,859,133 | 8/1989 | Maria | 414/462 |
| 4,941,797 | 7/1990 | Smillie, III | 414/462 |
| 4,969,793 | 11/1990 | Pawl | 414/462 |
| 5,011,361 | 4/1991 | Peterson . | |
| 5,038,983 | 8/1991 | Tomososki . | |
| 5,054,578 | 10/1991 | Smillie, III et al. | 414/462 X |
| 5,114,120 | 5/1992 | Bartelt et al. . | |
| 5,137,411 | 8/1992 | Eul et al. | 224/525 X |
| 5,431,522 | 7/1995 | Ross | 414/462 |
| 5,456,564 | 10/1995 | Bianchini . | |
| 5,482,424 | 1/1996 | Jones et al. | 224/510 X |
| 5,529,453 | 6/1996 | La Gois et al. | 414/462 |
| 5,664,717 | 9/1997 | Joder . | |

FOREIGN PATENT DOCUMENTS

| | | | |
|---|---|---|---|
| 809049 | 3/1969 | Canada | 414/540 |
| 664146 | 2/1988 | Switzerland | 414/490 |

OTHER PUBLICATIONS

Brochure for "Piggyback Pod" cargo box by USA Ventur-Craft Corp. 2 sheets, (No Date Given).

P. 28 of the Apr. 1998 issue of Truck Trend magazine showing the "Duratrunk", the "Piggyback Pod", and the "DOTX" boxes.

*Primary Examiner*—Gregory M. Vidovich
*Attorney, Agent, or Firm*—Jack Lo

[57] ABSTRACT

An external equipment carrier with a cargo box for a vehicle includes an arm with a proximal end for being attached to a trailer hitch on the vehicle. A manual scissors jack and a vertical guide rail are attached to the distal end of the arm. The top end of the jack is slidable along the guide rail. A cargo box is removably carried on a support bar attached to the top of the jack, and can be raised or lowered by operating the jack. Although the jack has a very high lifting capacity, it is very inexpensive, and does not require a locking or braking system. A pair of mirrors and brake lights are attached to an extendable arm connected to the guide rail. The mirrors enable a driver to see behind and below the box when backing up. The arm is articulated for retracting the box to a stowed position behind the vehicle, and pivoting the box to an extended position away from the tailgate or rear door of the vehicle. Wheels are attached to retractable legs on the box, so that the box can be easily transported once it is on the ground. In an alternative embodiment, the box is supported on a foldable platform attached to the top of the jack.

20 Claims, 6 Drawing Sheets

EXTERNAL EQUIPMENT CARRIER WITH CARGO BOX FOR VEHICLE

BACKGROUND OF THE INVENTION

1. Field of the Invention

This invention relates generally to carriers for supporting equipment externally on a vehicle.

2. Prior Art

Equipment too large for being carried inside a vehicle, such as wheelchairs, bicycles, and cargo boxes, may be supported on carriers attached to the rear of the vehicle. Some carriers are bolted directly to the vehicle, and others are attached to a conventional trailer hitch.

U.S. Pat. No. 5,664,717 to Joder shows an equipment carrier including a horizontal arm with a proximal end for being attached to a trailer hitch on a vehicle. The arm is articulated at two positions for pivoting away from the vehicle's tailgate or backdoor. It is specifically made for carrying bicycles, which must be manually lifted onto the carrier. U.S. Pat. No. 5,456,564 to Bianchini shows an equipment carrier with a platform connected by hinged arms that move through an arc. The arms deploy to a position far behind the vehicle, so that they cannot be deployed when the vehicle is parked closely in front of another vehicle. The arms are retracted to an almost vertical position, so that the carrier is not suitable for carrying a cargo box, because the box would be lifted so high that it would block the rear window of the vehicle. Further, it requires a powerful electric winch, which is very expensive. U.S. Pat. No. 5,114,120 to Bartelt et al. shows another equipment carrier with an articulated arm. U.S. Pat. No. 5,038,983 to Tomososki shows a cargo box and carrier for attaching to a trailer hitch. The box cannot be removed from the carrier. U.S. Pat. No. 5,011,361 to Peterson shows an equipment carrier with an electric screw actuator, which is powerful but very expensive. U.S. Pat. No. 4,844,528 to Johnson shows a rear mounted box for vehicles. It includes four retractable legs with wheels on the lower ends. The legs are individually operated, so that they are easily set to incorrect lengths by mistake, especially over uneven ground. U.S. Pat. No. 4,695,218 to Boyer shows another equipment carrier with an expensive screw actuator. U.S. Pat. No. 4,400,129 to Eisenberg et al. shows an equipment carrier with a spring-loaded pivoting arm which is limited to relatively light loads. Equipment carriers sold under the trademark "PIGGYBACK" by VenturCraft, and "DOTX" by Dotronix are cargo boxes mounted on articulated arms, but the boxes must be manually lifted onto and off the arms. Once removed from the arms, the boxes must be carried by hand. Because prior art equipment carriers protrude far behind the vehicle, the driver cannot accurately judge the clearance behind them when backing up, so that they can be easily damaged.

OBJECTS OF THE INVENTION

Accordingly, objects of the present external equipment carrier with a cargo box for a vehicle are:

- to carry a large and heavy cargo box outside a vehicle;
- to lower and raise the cargo box very easily on and off the ground;
- to be pivotable away from the rear of the vehicle to avoid blocking the tailgate or rear door;
- to enable a driver to see behind and below the cargo box when backing up;
- to be compact, so that no extra space is needed for loading and unloading the equipment when the vehicle is parked in front of another vehicle;
- to enable the cargo box to be easily transported once it is on the ground; and
- to be inexpensive.

Further objects of the present invention will become apparent from a consideration of the drawings and ensuing description.

BRIEF SUMMARY OF THE INVENTION

An external equipment carrier with a cargo box for a vehicle includes an arm with a proximal end for being attached to a trailer hitch on the vehicle. A manual scissors jack and a vertical guide rail are attached to the distal end of the arm. The top end of the jack is slidable along the guide rail. A cargo box is removably carried on a support bar attached to the top of the jack, and can be raised or lowered by operating the jack. Although the jack has a very high lifting capacity, it is very inexpensive, and does not require a locking or braking system. A pair of mirrors and brake lights are attached to an extendable arm connected to the guide rail. The mirrors enable a driver to see behind and below the box when backing up. The arm is articulated for retracting the box to a stowed position behind the vehicle, and pivoting the box to an extended position away from the tailgate or rear door of the vehicle. Wheels are attached to retractable legs on the box, so that the box can be easily transported once it is on the ground. In an alternative embodiment, the box is supported on a foldable platform attached to the top of the jack.

DRAWING REFERENCE NUMERALS

| | | | |
|---|---|---|---|
| 10. | Arm | 11. | Trailer Hitch |
| 12. | Vehicle | 13. | Guide Rail |
| 14. | Scissors Jack | 15. | Link Arms |
| 16. | Slots | 17. | Top Support Member |
| 18. | Bottom Support Bar | 19. | Mirrors |
| 20. | Brake Lights | 21. | Extendable Arm |
| 22. | Post | 23. | First Section |
| 24. | Middle Section | 25. | Hinge |
| 26. | End Section | 27. | Hinge |
| 28. | Disc | 29. | Disc |
| 30. | T-Bolt | 31. | Notch |

-continued

| | | | |
|---|---|---|---|
| 32. | Latch | 33. | Disc |
| 34. | Notch | 35. | Latch |
| 36. | Cargo Box | 37. | Guide Bars |
| 38. | Top Mounting Brackets | 39. | Bottom Mounting Bracket |
| 40. | Legs | 41. | Brackets |
| 42. | Pin | 43. | Holes |
| 44. | Wheels | 45. | Lamps |
| 46. | Recessed Channels | 47. | Sensor Switch |
| 48. | Sensor Switch | 49. | Battery |
| 50. | Power Switch | 51. | Connecting Member |
| 52. | Key | 53. | Hole |
| 54. | Rubber Bumper | 55. | Tab |
| 56. | Slot | 57. | Pin |
| 58. | Equipment Carrier | 59. | Socket |
| 60. | Rollers | 61. | Bracket |
| 62. | Equipment Carrier | 63. | Vertical Member |
| 64. | Platform | 65. | Cargo Box |
| 66. | Brake Lights | 67. | Hook |
| 68. | Pin | | |

DETAILED DESCRIPTION OF THE INVENTION

Figure 1:
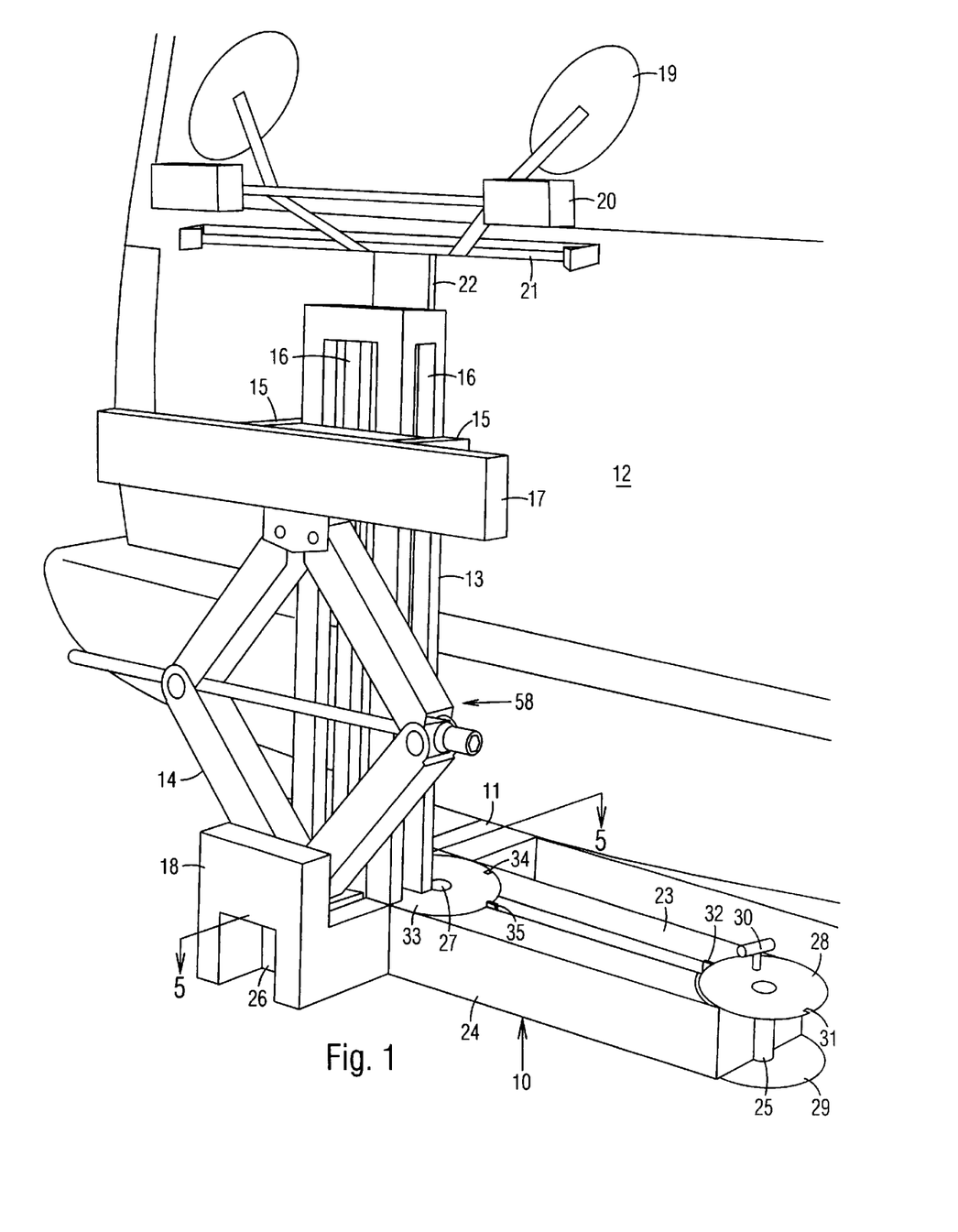
FIG. 1 is a rear perspective view of the present equipment carrier.

FIG. 1:

A first embodiment of an external equipment carrier 58 for a vehicle 12 is shown in a rear perspective view in FIG. 1. It includes an articulated arm 10 with a proximal end for being attached to a conventional trailer hitch 11 of vehicle 12. A vertical guide rail 13 is attached near a distal end of arm 10. A scissors jack 14 has a lower end fixedly attached to the distal end of arm 10 behind guide rail 13. A pair of link arms 15 extending forwardly from the top end of jack 14 are movably connected to slots 16 on the sides of guide rail 13. A horizontal top support member 17 is attached to the top of jack 14. A bottom support member 18 is attached to the distal end of arm 10 behind jack 14. A pair of mirrors 19 and brake lights 20 are attached to an extendable arm 21, which is attached to a post 22 slidable vertically on guide rail 13. Brake lights 20 are for being connected to the vehicle's braking system in a conventional manner well known in the art. Arm 21 is shown in a fully retracted position.

Figure 6:
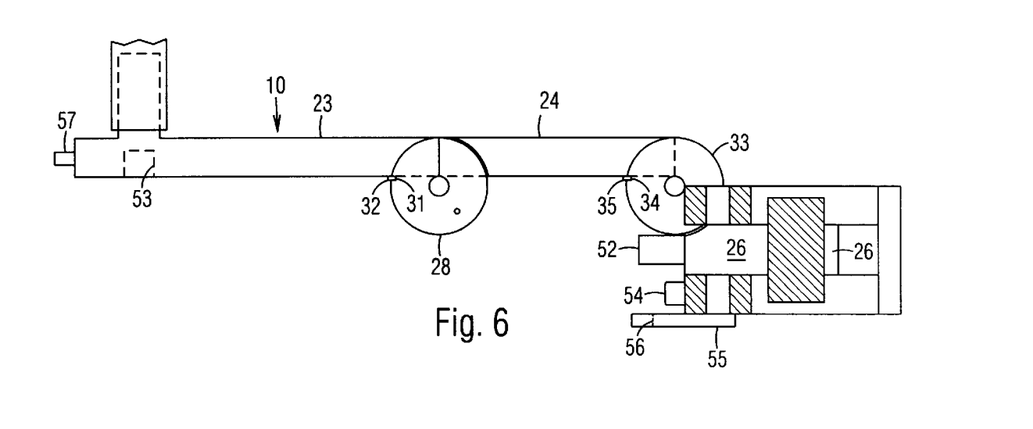
FIG. 6 is a top view of the articulated arm in an extended position.

Arm 10 is shown in a retracted or stowed position. It includes a fixed first section 23 hinged to a pivotable middle section 24 by a hinge 25. Middle section 24 is hinged to an end section 26 by a hinge 27. Hinge 25 includes top and bottom discs 28 and 29 fixedly attached to middle section 24, but are movable relative to first section 23. A T-bolt 30 is screwed through top disc 28 into first section 23 for securing middle section 24 in the retracted position shown. A notch 31 is provided on disc 28 for mating with a pivoting latch 32 on a side of first section 23 and locking middle section 24 when middle section 24 is pivoted to an extended position (FIG. 6). Hinge 27 includes a top disc 33 and a bottom disc (not shown) fixedly attached to end section 26, but are movable relative to middle section 24. A notch 34 is provided on disc 33 for mating with a pivoting latch 35 on a side of middle section 24 and locking end section 26 when end section 26 is pivoted to an extended position (FIG. 6).

Figure 2:
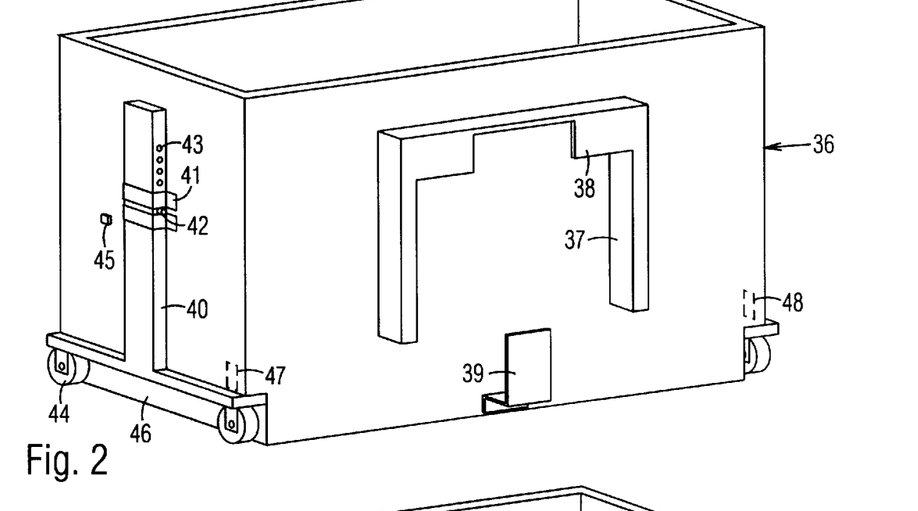
FIG. 2 is a front perspective view of a cargo box with its legs in a retracted position.
Figures 3, 4:
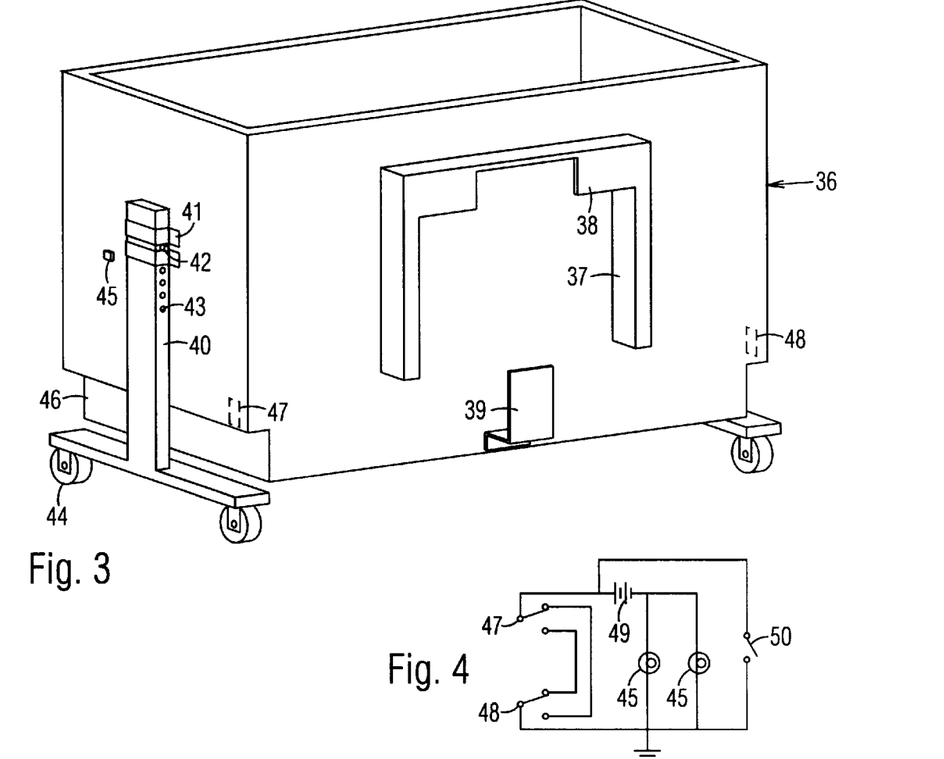
FIG. 3 is a front perspective view of the cargo box with its legs in an extended position.
FIG. 4 is a schematic diagram of a lighting circuitry of the cargo box.

FIGS. 2–4:

A cargo box 36 for the equipment carrier is shown in a front perspective view in FIG. 2. A pair of vertical guide bars 37 are attached to a front side of box 36. A pair of downwardly directed top mounting brackets 38 are attached to the insides of bars 37. An upwardly directed bottom mounting bracket 39 is attached to the front of box 36. A pair of legs 40 are attached to opposite sides of box 36. A vertical portion of each leg 40 is slidable within a pair of brackets 41 mounted in spaced relation on a corresponding side of box 36. Each leg 40 is movable between a retracted position shown in FIG. 2 and an extended position shown in FIG. 3. A plurality of holes 43 are provided on each leg 40, which can be secured in a plurality of positions for different vehicles by positioning a suitable hole 43 between brackets 41, and inserting pin 42 in hole 43. The spaced brackets 41 enable hole 43 to be easily aligned between them. Wheels 44 attached to the bottom of legs 40 enable box 36 to be easily transported once it is on the ground, even when heavy objects are carried in cargo box 36. A pair of lamps 45 (one shown) are mounted on the sides of box 36 near each pair of brackets 41 for illuminating them and aiding the insertion of pin 42 in the dark. Recessed channels 46 are provided on the lower side edges of box 36 for receiving the horizontal portions of legs 40, which can be retracted flush with the bottom of box 36. Sensor switches 47 and 48 are mounted in channels 46 for sensing the retraction of legs 40.

In the circuit diagram shown in FIG. 4, lamps 45 are connected in parallel to a battery 49, which is preferably mounted on the cargo box. Sensor switches 47 and 48, which are preferably SPDT switches, are connected in series to lamps 45, and a power switch 50 is connected in parallel to sensor switches 47 and 48. Power switch 50 is preferably mounted on the driver's side of cargo box 36, and is turned off in daylight. Lamps 45 are deactivated when leg 40 are both retracted or both extended, and activated when either leg is extended and the other retracted. Power switch 50 can be used to turn on lamps 45 when legs 40 are both extended or both retracted for illuminating brackets 41 at night, so that pins 42 can be inserted more easily.

Figure 5:
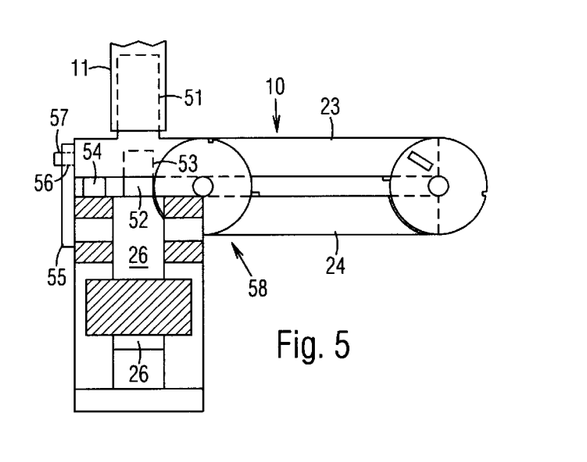
FIG. 5 is a top view of an articulated arm of the equipment carrier, taken along line 5—5 in FIG. 1, in a stowed position.

FIGS. 5–6:

Equipment carrier 58 is shown in a top sectional view in FIG. 5 in a stowed position. End section 26 of arm 10 is perpendicular to middle section 24. A connecting member 51 extending perpendicularly from the proximal end of first section 23 is secured in trailer hitch 11. A key 52 extending from the inner side of end section 26 is positioned in a hole 53 in first section 23 for aligning end section 26 with the proximal end of first section 23. A rubber bumper 54 is attached to the inner side of end section 26 for engaging first section 23. A tab 55 attached to end section 26 has a horizontal slot 56 detachably mated with a pin 57 extending from the proximal end of first section 23 for securing end section 26 in the stowed position.

As shown in FIG. 6, the equipment carrier is extendable for enabling access to the tailgate or rear door of the vehicle. It is extended by removing T-bolt 30 (FIG. 1), pivoting middle section 24 counterclockwise until latch 32 is engaged in notch 31 on disc 28, and pivoting end section 26 clockwise until latch 35 is engaged in notch 34 on disc 33.

Figure 7:
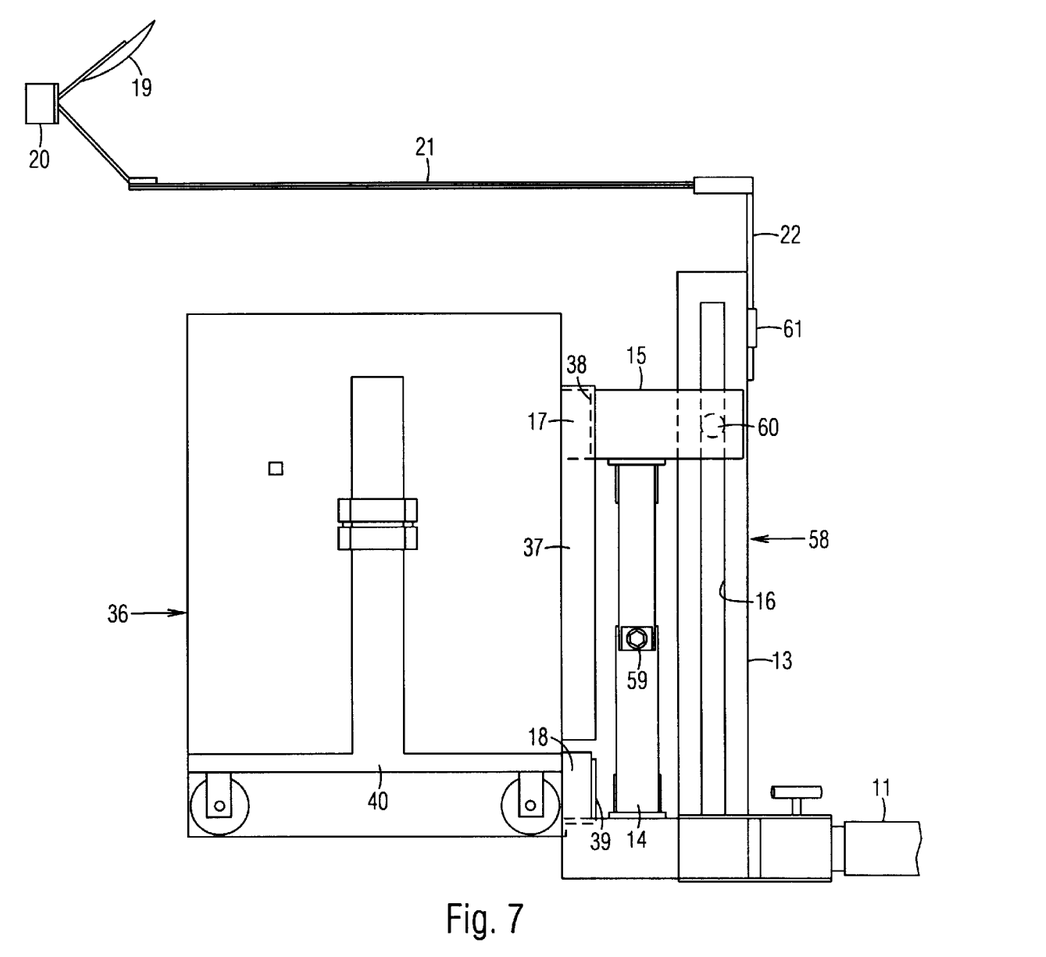
FIG. 7 is a right side view of the equipment carrier with the cargo box attached.
Figure 8:
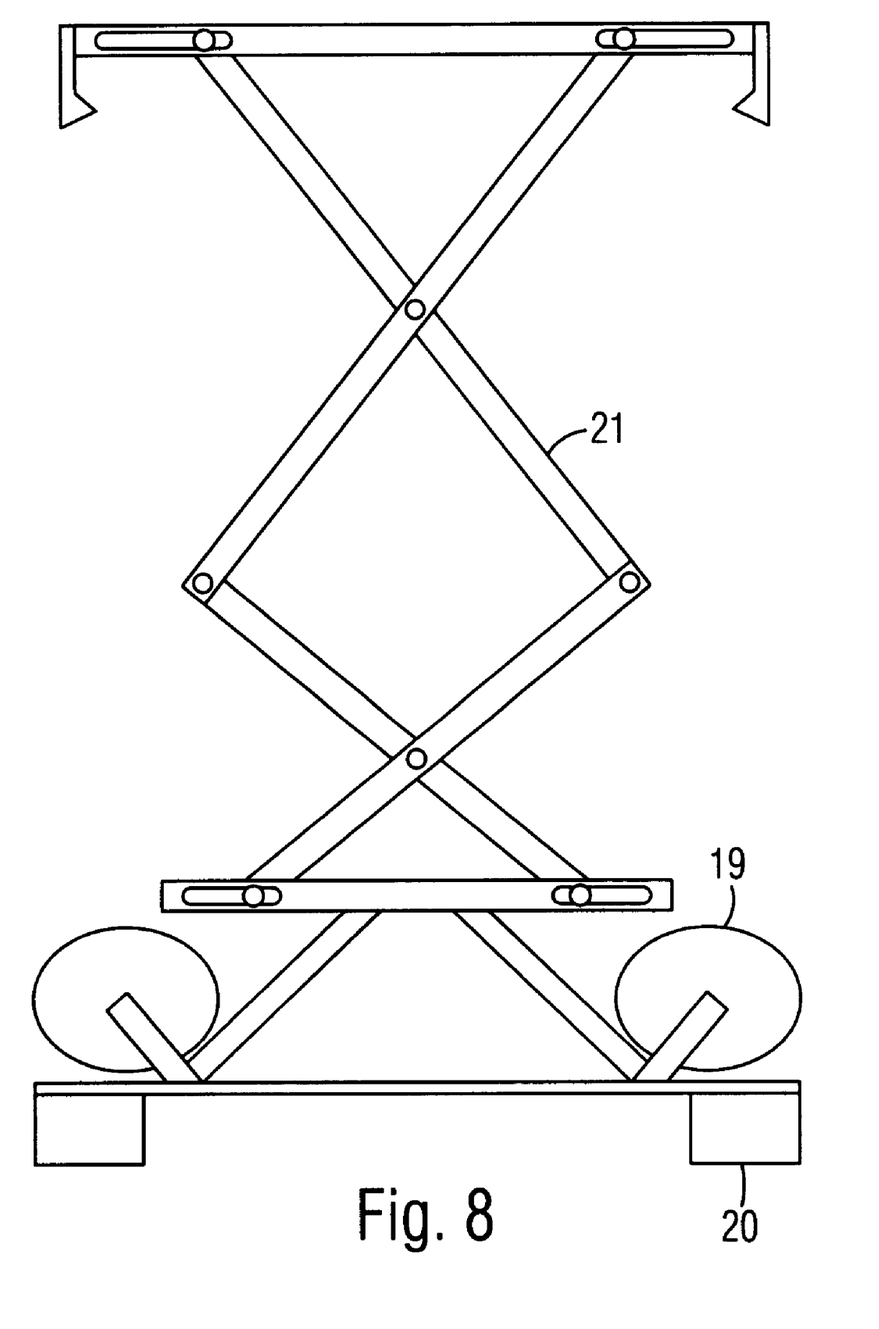
FIG. 8 is a top view of a rear view mirror and brake light assembly in an extended position.

FIGS. 7–8:

Equipment carrier 58 is shown in a stowed and raised position in a right side view in FIG. 7. Legs 40 (one shown) are in a retracted position. Cargo box 36 is attached to equipment carrier 58 when jack 14 is in a fully lowered position, so that cargo box 36 does not have to be lifted onto it. Cargo box 36 is attached by positioning top support member 17 between guide bars 37 (one shown) and behind mounting brackets 38 (one shown), and operating jack 14 with a hand crank (not shown) inserted into a socket 59, until bottom mounting bracket 39 is engaged under bottom support member 18, and cargo box 36 is raised to the position shown.

Although jack 14 is very inexpensive, it is powerful enough to easily lift cargo box 36 even when heavy objects are carried therein. The top of jack 14 is guided along a vertical direction by rollers 60 (one shown) attached to the insides of arms 15 (one shown) and positioned in slots 16 of guide rail 13. Space is conserved by moving cargo box 36 in a purely vertical direction, so that it can be lifted and lowered even when the vehicle is parked closely in front of another vehicle.

Arm 21 is fully extended to the position shown, so that mirrors 19 (one shown) enable the driver to see behind and below cargo box 36 when backing up. Arm 21 can be adjusted up and down for aligning with the rear window of the vehicle by sliding post 22 in a bracket 61 attached to guide rail 13. Arm 21 is shown in a top view in FIG. 8 in the extended position. The rest of equipment carrier 58 is not shown in FIG. 8.

Figure 9:
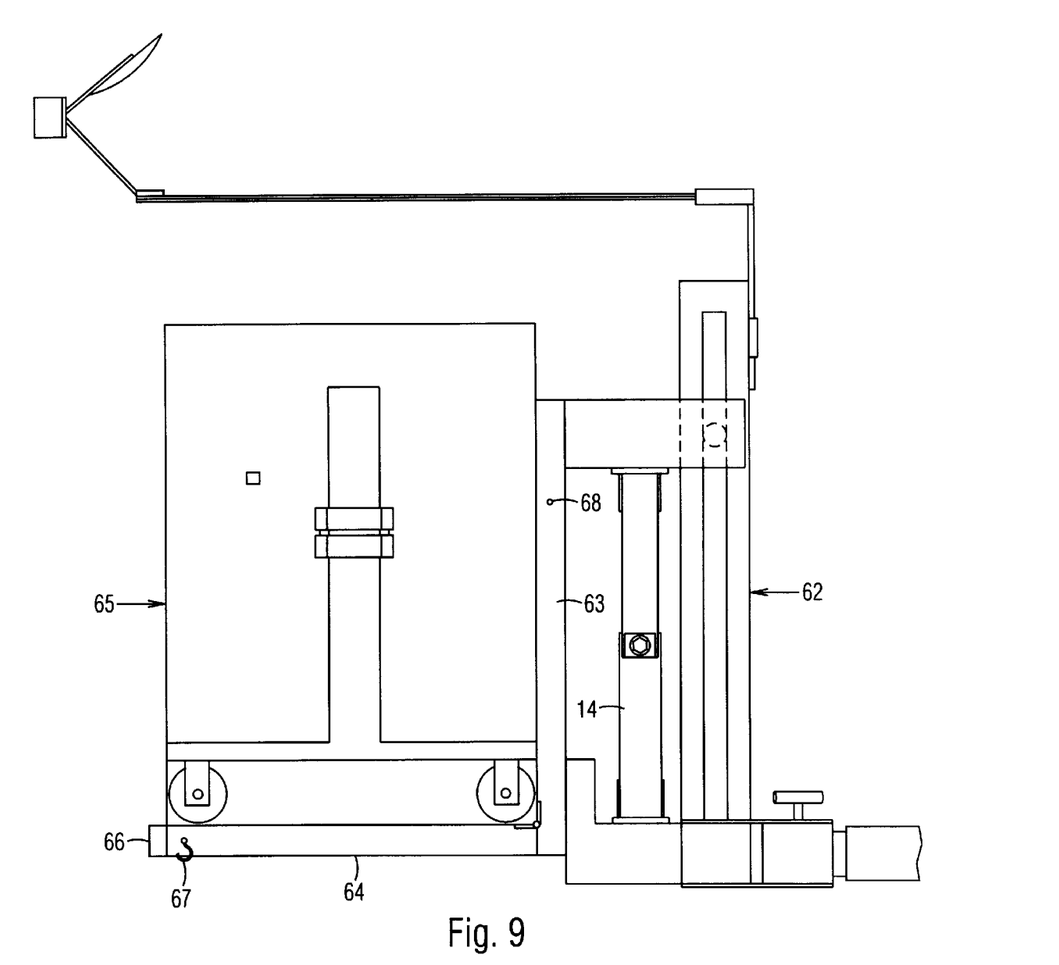
FIG. 9 is an alternative embodiment of the equipment carrier.

FIG. 9:

An alternative equipment carrier 62 is shown in a right side view in FIG. 9. It is the same as the embodiment shown in FIG. 1, except for a vertical member 63 extending downwardly from the top of jack 14, and a platform 64 hinged to the lower end of vertical member 63 for supporting a cargo box 65. A pair of brake lights 66 (one shown) are attached to the rear end of platform 64. A hook 67 attached to a side of platform 64 is arranged to engage a pin 68 on vertical member 63 for securing platform 64 in a retracted position when cargo box 65 is removed.

SUMMARY AND SCOPE

Accordingly, an external equipment carrier with a cargo box for a vehicle is provided. It can carry a large and heavy cargo box outside the vehicle. It can lower and raise the cargo box very easily onto and off the ground. It is movable away from the rear of the vehicle to provide access to the tailgate or rear door. It enables a driver to see behind and below the cargo box when backing up. It is compact, so that no extra space is needed for loading and unloading the cargo box when the vehicle is parked in front of another vehicle. The cargo box can be easily transported once it is on the ground. It is also inexpensive.

Although the above description is specific, it should not be considered as a limitation on the scope of the invention, but only as an example of the preferred embodiment. Many substitutes and variations are possible within the teachings of the invention. For example, hinge 27 may be eliminated, so that end section 26 is fixedly attached to middle section 24. All hinges in arm 10 may be eliminated, and arm 10 substantially shortened, so that guide rail 13 and jack 14 are not pivotable away from the rear of the vehicle, which may be acceptable if access to the rear of the vehicle is unnecessary. Guide rail 13 may be of any other form. Equipment carrier 58 can be used to carry other equipment instead of a cargo box, such as but not limited to bicycles, wheelchairs, scooters, etc. Top support member 17 may be of any suitable form for supporting such other equipment. Arm 10 can be arranged on the left side of the vehicle as a mirror image of the embodiment shown. Therefore, the scope of the invention should be determined by the appended claims and their legal equivalents, not by the examples given.

I claim:

1. An external equipment carrier for a vehicle, comprising:

a connecting member for attaching to a rear of said vehicle;

an arm attached to said connecting member;

a vertical guide rail having a lower end connected to said arm;

a scissors jack having a lower end connected to said arm and arranged for vertical actuation, an upper end of said scissors jack being connected to said guide rail and movable along said guide rail, said scissors jack being movable between a lowered position and a raised position; and a support member attached to said scissors jack for supporting equipment.

2. The external equipment carrier of claim 1, wherein said arm includes a first section connected to said connecting member, a middle section hinged to said first section, and an end section hinged to said middle section, said scissors jack being attached to said end section, said arm being movable between a folded position behind said vehicle and an extended position to a side of said vehicle.

3. The external equipment carrier of claim 1, wherein said arm includes a first section connected to said connecting member, a middle section hinged to said first section, and an end section connected to said middle section, said scissors jack being attached to said end section, said arm being movable between a folded position behind said vehicle and an extended position to a side of said vehicle.

4. The external equipment carrier of claim 1, further including a pair of longitudinal slots on opposite sides of said vertical guide rail, a pair of link arms extending from said top end of said scissors jack and movably positioned on said opposite sides of said vertical guide rail, and a pair of rollers attached to said link arms, said rollers respectively engaging said slots in said guide rail.

5. The external equipment carrier of claim 1, further incuding a horizontally extendable arm attached to a top end of said guide rail, and a mirror attached to a distal end of said extendable arm, said distal end of said extendable arm being extendable rearwards for positioning behind said equipment, said mirror for enabling a driver to see behind and below said equipment when backing up.

6. The external equipment carrier of claim 1, further including a cargo box removably attached to said support member.

7. An external equipment carrier for a vehicle, comprising:

a connecting member for attaching to a rear of said vehicle;

an arm attached to said connecting member;

a vertical guide rail having a lower end connected to said arm;

a scissors jack having a lower end connected to said arm and arranged for vertical actuation, an upper end of said scissors jack being connected to said guide rail and movable along said guide rail, said scissors jack being movable between a lowered position and a raised position;

a vertical member attached to said upper end of said scissors jack; and a platform having a proximal end connected to a lower end of said vertical member, said platform being in a horizontal position for supporting equipment.

8. The external equipment carrier of claim 7, wherein said arm includes a first section connected to said connecting member, a middle section hinged to said first section, and an end section hinged to said middle section, said scissors jack being attached to said end section, said arm being movable between a folded position behind said vehicle and an extended position to a side of said vehicle.

9. The external equipment carrier of claim 7, wherein said arm includes a first section connected to said connecting member, a middle section hinged to said first section, and an end section connected to said middle section, said scissors jack being attached to said end section, said arm being movable between a folded position behind said vehicle and an extended position to a side of said vehicle.

10. The external equipment carrier of claim 7, further including a pair of longitudinal slots on opposite sides of said vertical guide rail, a pair of link arms extending from said top end of said scissors jack and movably positioned on said opposite sides of said vertical guide rail, and a pair of rollers respectively attached to said link arms, said rollers engaging said slots in said guide rail.

11. The external equipment carrier of claim 7, further including a horizontally extendable arm attached to a top end of said guide rail, and a mirror attached to a distal end of said extendable arm, said distal end of said extendable arm being extendable rearwards for positioning behind said equipment, said mirror for enabling a driver to see behind and below said equipment when backing up.

12. The external equipment carrier of claim 7, further including a cargo box removably supported on said platform.

13. An external equipment carrier for a vehicle, comprising:

a connecting member for attaching to a rear of said vehicle;

an arm attached to said connecting member;

a vertical guide rail having a lower end connected to said arm;

a scissors jack having a lower end connected to said arm and arranged for vertical actuation, an upper end of said scissors jack being connected to said guide rail and movable along said guide rail;

a top support member attached to said upper end of said scissors jack;

a bottom support bar attached to a rear end of said arm;

a cargo box;

a downwardly directed top mounting bracket attached to a front side of said cargo box, said top mounting bracket removably engaging said top support member when said scissors jack is raised; and an upwardly directed bottom mounting bracket attached to said front side of said cargo box, said bottom mounting bracket removably engaging said bottom support bar when said cargo box is moved by said scissors jack to a raised position.

14. The external equipment carrier of claim 13, wherein said arm includes a first section connected to said connecting member, a middle section hinged to said first section, and an end section hinged to said middle section, said scissors jack being attached to said end section, said arm being movable between a folded position behind said vehicle and an extended position to a side of said vehicle.

15. The external equipment carrier of claim 13, wherein said arm includes a first section connected to said connecting member, a middle section hinged to said first section, and an end section connected to said middle section, said scissors jack being attached to said end section, said arm being movable between a folded position behind said vehicle and an extended position to a side of said vehicle.

16. The external equipment carrier of claim 13, further including a pair of longitudinal slots on opposite sides of said vertical guide rail, a pair of link arms extending from said top end of said scissors jack and movably positioned on said opposite sides of said vertical guide rail, and a pair of rollers attached to said link arms, said rollers respectively engaging said slots in said guide rail.

17. The external equipment carrier of claim 13, further including a horizontally extendable arm attached to a top end of said guide rail, and a mirror attached to a distal end of said extendable arm, said distal end of said extendable arm being extendable rearwards to a position behind said cargo box, said mirror for enabling a driver to see behind and below said cargo box when backing up.

18. The external equipment carrier of claim 13, further including a plurality of retractable legs attached to said cargo box, and a plurality of wheels attached to said legs enabling said cargo box to be easily transportable on a ground when detached from said top support member and said bottom support bar.

19. The external equipment carrier of claim 18, further including a plurality of holes arranged vertically along each of said legs, a plurality of pairs of spaced apart brackets attached to opposite sides of said cargo box, each of said pairs of spaced apart brackets slidably receiving one of said legs, and a plurality of pins each extending through one of said holes in a corresponding one of said legs, each of said pins being positioned between a corresponding pair of spaced apart brackets.

20. The external equipment carrier of claim 19, further including a pair of lamps attached to said opposite sides of said cargo box illuminating said spaced apart brackets in darkness.

* * * * *